United States Patent
Kiilerich Pratas et al.

(10) Patent No.: US 12,507,207 B2
(45) Date of Patent: Dec. 23, 2025

(54) EFFICIENT SIGNALING OF NON-PREFERRED TRANSMISSION RESOURCES

(71) Applicant: Nokia Technologies Oy, Espoo (FI)

(72) Inventors: Nuno Manuel Kiilerich Pratas, Gistrup (DK); Lianghai Ji, Aalborg (DK); Ling Yu, Kauniainen (FI)

(73) Assignee: Nokia Technologies Oy, Espoo (FI)

( * ) Notice: Subject to any disclaimer, the term of this patent is extended or adjusted under 35 U.S.C. 154(b) by 338 days.

(21) Appl. No.: 17/708,179

(22) Filed: Mar. 30, 2022

(65) Prior Publication Data
US 2022/0322301 A1    Oct. 6, 2022

(30) Foreign Application Priority Data

Mar. 31, 2021    (FI) .................................... 20215394

(51) Int. Cl.
| | |
|---|---|
| H04W 72/02 | (2009.01) |
| H04L 5/16 | (2006.01) |
| H04W 72/1263 | (2023.01) |
| H04W 72/20 | (2023.01) |

(Continued)

(52) U.S. Cl.
CPC .............. *H04W 72/02* (2013.01); *H04L 5/16* (2013.01); *H04W 72/1263* (2013.01); *H04W 72/20* (2023.01); *H04W 72/51* (2023.01); *H04W 92/18* (2013.01)

(58) Field of Classification Search
CPC . H04W 72/02; H04W 72/1263; H04W 72/20; H04W 72/51; H04W 92/18
See application file for complete search history.

(56) References Cited

U.S. PATENT DOCUMENTS

| | | | |
|---|---|---|---|
| 11,917,616 B2* | 2/2024 | Farag | H04L 5/0053 |
| 11,937,269 B2* | 3/2024 | Hong | H04W 72/1263 |
| 2017/0331577 A1* | 11/2017 | Parkvall | H04L 5/1469 |

(Continued)

FOREIGN PATENT DOCUMENTS

| | | |
|---|---|---|
| CN | 111937463 A | 3/2021 |
| CN | 112333661 A | 3/2021 |
| WO | WO2017150956 A1 | 3/2021 |

OTHER PUBLICATIONS

"Inter-UE coordination in sidelink resource allocation", Huawei, HiSilicon, 3GPP TSG RAN WG1 Meeting #104-e, R1-2100206, Feb. 2021, 12 pages.

(Continued)

*Primary Examiner* — Jay P Patel
(74) *Attorney, Agent, or Firm* — McCarter & English LLP

(57) ABSTRACT

Various example embodiments relate to signaling of non-preferred transmission resources. An apparatus may determine a set of non-preferred transmission resources for a second apparatus. The apparatus may further determine a set of inapplicable transmission resources for the second apparatus. The apparatus may determine a reduced set of non-preferred transmission resources based on excluding at least one of the set of inapplicable transmission resources from the set of non-preferred transmission resources. The apparatus may transmit an indication of the reduced set of non-preferred transmission resources to the second apparatus. Apparatuses, methods, and computer programs are disclosed.

21 Claims, 4 Drawing Sheets

(51) Int. Cl.
*H04W 72/51* (2023.01)
*H04W 92/18* (2009.01)

(56) References Cited

U.S. PATENT DOCUMENTS

| | | | | |
|---|---|---|---|---|
| 2017/0331670 | A1* | 11/2017 | Parkvall | H04L 41/0816 |
| 2021/0235328 | A1* | 7/2021 | Hui | H04W 72/56 |
| 2021/0258951 | A1* | 8/2021 | Sakhnini | H04W 56/0015 |
| 2021/0314821 | A1* | 10/2021 | Huang | H04L 12/2869 |
| 2021/0314966 | A1* | 10/2021 | Hui | H04W 72/56 |
| 2021/0321250 | A1* | 10/2021 | Ryu | H04W 4/08 |
| 2021/0321396 | A1* | 10/2021 | Li | H04W 72/23 |
| 2021/0329574 | A1* | 10/2021 | Ang | H04L 5/0037 |
| 2021/0400636 | A1* | 12/2021 | Seo | H04L 5/0055 |
| 2022/0015071 | A1* | 1/2022 | Hui | H04W 72/56 |
| 2022/0030575 | A1* | 1/2022 | Farag | H04L 5/0053 |
| 2022/0095280 | A1* | 3/2022 | Farag | H04L 1/1671 |
| 2022/0174655 | A1* | 6/2022 | Tsai | H04W 72/20 |
| 2022/0312389 | A1* | 9/2022 | Li | H04W 72/56 |
| 2022/0338186 | A1* | 10/2022 | Hui | H04W 72/02 |
| 2023/0141004 | A1* | 5/2023 | Hong | H04W 76/28 370/311 |
| 2023/0189292 | A1* | 6/2023 | Ganesan | H04W 76/11 370/329 |
| 2023/0209388 | A1* | 6/2023 | Hwang | H04W 28/0236 370/329 |
| 2023/0247528 | A1* | 8/2023 | Liu | H04W 74/0808 370/329 |
| 2024/0014979 | A1* | 1/2024 | Lei | H04L 5/0092 |
| 2024/0015755 | A1* | 1/2024 | Pan | H04W 72/25 |
| 2024/0064733 | A1* | 2/2024 | Ghanbarinejad | H04L 5/0094 |
| 2024/0146480 | A1* | 5/2024 | Ghanbarinejad | H04L 5/0051 |
| 2024/0357702 | A1* | 10/2024 | Park | H04W 76/14 |

OTHER PUBLICATIONS

"Inter-UE coordination in sidelink resource allocation mode 2", Nokia, Nokia Shanghai Bell, 3GPP TSG RAN WG1 #104-e, R1-2100539, Feb. 2021, 8 pages.

"Inter-UE Coordination for Mode 2 Resource Allocation", Apple, 3GPP TSG RAN WG1 #104-e, R1-2101358, Feb. 2021, 8 pages.

* cited by examiner

EFFICIENT SIGNALING OF NON-PREFERRED TRANSMISSION RESOURCES

TECHNICAL FIELD

Various example embodiments generally relate to the field of data communications. In particular, some example embodiments relate to signaling of non-preferred transmission resources.

BACKGROUND

In various wireless communication systems, for example 3GPP 5G New Radio (NR), a device such as for example a user equipment (UE) may communicate not only with base stations but also with other device(s) directly over a sidelink (SL) connection. Sidelink connections may be applied for example in vehicle-to-everything (V2X) applications, where time-critical information may be exchanged between vehicles. Coordination of transmission resources may be applied between devices. It may be however desired to avoid excessive signaling overhead.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. The scope of protection sought for various embodiments of the invention is set out by the independent claims. The example embodiments and features, if any, described in this specification that do not fall under the scope of the independent claims are to be interpreted as examples useful for understanding various example embodiments of the invention.

Example embodiments enable to reduce signaling overhead associated with signaling non-preferred transmission resources. This and other benefits may be achieved by the features of the independent claims. Further advantageous implementation forms are provided in the dependent claims, the description, and the drawings.

According to a first aspect, an apparatus may comprise means for determining a set of non-preferred transmission resources for a second apparatus; means for determining a set of inapplicable transmission resources for the second apparatus; means for determining a reduced set of non-preferred transmission resources based on excluding at least one of the set of inapplicable transmission resources from the set of non-preferred transmission resources; and means for transmitting an indication of the reduced set of non-preferred transmission resources to the second apparatus.

According to an example embodiment of the first aspect, the apparatus may further comprise means for determining the reduced set of non-preferred transmission resources based on excluding an intersection of the set of non-preferred transmission resources and the set of inapplicable transmission resources from the set of non-preferred transmission resources.

According to an example embodiment of the first aspect, the set of inapplicable transmission resources may comprise at least one first transmission resource overlapping with at least one scheduled transmission by the second apparatus or at least one scheduled transmission to the second apparatus.

According to an example embodiment of the first aspect, the apparatus may further comprise means for determining capability information of the second apparatus; and means for assigning the at least one first transmission resource to the set of inapplicable transmission resources, in response to determining that transmission at the at least one first transmission resource by the second apparatus is hindered due to at least one capability of the second apparatus indicated in the capability information.

According to an example embodiment of the first aspect, the capability information of the second apparatus may be preconfigured at the apparatus, or the apparatus may further comprise: means for receiving the capability of the second apparatus from the second apparatus or from the third apparatus.

According to an example embodiment of the first aspect, the capability information of the second apparatus may comprise at least one of: an indication of a half-duplex capability, an indication of a half-duplex capability at a sidelink interface, an indication of a half-duplex capability at a radio access network air interface, an indication of whether the second apparatus supports multiple simultaneous transmissions at the sidelink interface, or an indication of whether the second apparatus supports multiple simultaneous transmissions at the radio access network air interface.

According to an example embodiment of the first aspect, the apparatus may further comprise means for receiving an indication of at least one identifier configured to be used by the second apparatus; and means for determining the at least one first transmission resource based on sidelink control information indicative of a resource allocation of the at least one scheduled transmission, wherein the at least one scheduled transmission is associated with the at least one identifier configured to be used by the second apparatus.

According to an example embodiment of the first aspect, the at least one scheduled transmission may comprise a hybrid automatic repeat request feedback transmission.

According to an example embodiment of the first aspect, the at least one first transmission resource may comprise at least one physical sidelink feedback channel resource allocated for the hybrid automatic repeat request feedback transmission by the second apparatus.

According to an example embodiment of the first aspect, the apparatus may further comprise means for assigning the resource allocation of the at least one scheduled transmission, wherein the at least one scheduled transmission is indicated by the sidelink control information, to the set of inapplicable transmission resources, in response to detecting a hybrid automatic repeat request feedback message at the at least a physical sidelink feedback channel resource associated to the sidelink control information indicative of the resource allocation of the at least one scheduled transmission.

According to an example embodiment of the first aspect, the apparatus may further comprise means for obtaining capability information of at least one intended receiver of a sidelink data transmission by the second apparatus; and means for assigning at least one second transmission resource to the set of inapplicable transmission resources, in response to determining that reception from the at least one second transmission resource by the at least one intended receiver is hindered due to at least one capability indicated in the capability information of the at least one intended receiver.

According to an example embodiment of the first aspect, the capability information of the at least one intended receiver may comprise an indication of a discontinuous reception configuration of the at least one intended receiver.

According to an example embodiment of the first aspect, the intended receiver may comprise the apparatus.

According to an example embodiment of the first aspect, the at least one second transmission resource may comprise at least one sidelink transmission resource allocated for sidelink communication between the apparatus and the second apparatus.

According to an example embodiment of the first aspect, the at least one intended receiver may comprise a plurality of broadcast or groupcast receivers associated with a network-configured discontinuous reception configuration or a preconfigured discontinuous reception configuration.

According to an example embodiment of the first aspect, the at least one intended receiver may comprise a third apparatus, and the apparatus may further comprise means for receiving the capability information of the intended receiver from the second apparatus or from the third apparatus.

According to an example embodiment of the first aspect, the apparatus may further comprise means for receiving an inter-user equipment sidelink coordination request.

According to an example embodiment of the first aspect, the inter-user equipment sidelink coordination request may comprise the at least one identifier configured to be used by the second apparatus, the capability information of the at least one intended receiver, and/or an indication of a priority of the sidelink data transmission, wherein the sidelink data transmission is to be coordinated by the apparatus.

According to an example embodiment of the first aspect, the apparatus may further comprise means for assigning the at least one first transmission resource and/or the at least one second transmission resource to the set of inapplicable transmission resources, in response to determining that a priority associated with the at least one first transmission resource and/or the at least one second transmission resource is higher or equal to a threshold.

According to an example embodiment of the first aspect, the threshold may comprise a priority threshold for the priority of the sidelink data transmission.

According to an example embodiment of the first aspect, the apparatus may further comprise means for assigning the at least one second transmission resource to the set of inapplicable transmission resources, in response to determining that a priority of a sidelink transmission at the at least one second transmission resource to the at least one the intended receiver is lower than a priority of a sidelink transmission at the at least one second transmission resource to the second apparatus.

According to an example embodiment of the first aspect, the apparatus may further comprise means for assigning the at least one first transmission resource and/or the at least one second transmission resource to the set of inapplicable transmission resources, in response to determining that the at least one first transmission resource and/or the at least one second transmission resource belong to a plurality of periodically allocated transmission resources.

According to an example embodiment of the first aspect, the apparatus may further comprise means for receiving a transmission from the second apparatus from at least one third transmission resource; and means for assigning transmission resources associated with the at least one third transmission resource in configuration data of a resource pool from which the transmission is received to the set of inapplicable transmission resources.

According to an example embodiment of the first aspect, the apparatus may further comprise means for determining the transmission resources associated with the at least one third transmission resource based on at least one resource reservation period indicated in the configuration data of the resource pool.

According to an example embodiment of the first aspect, the set of non-preferred transmission resources may comprise non-preferred transmission resources from a point-of-view of the at least one intended receiver of the second apparatus.

According to a second aspect, a method may comprise: determining a set of non-preferred transmission resources for a second apparatus; determining a set of inapplicable transmission resources for the second apparatus; determining a reduced set of non-preferred transmission resources based on excluding at least one of the set of inapplicable transmission resources from the set of non-preferred transmission resources; and transmitting an indication of the reduced set of non-preferred transmission resources to the second apparatus.

According to an example embodiment of the second aspect, the method may further comprise determining the reduced set of non-preferred transmission resources based on excluding an intersection of the set of non-preferred transmission resources and the set of inapplicable transmission resources from the set of non-preferred transmission resources.

According to an example embodiment of the second aspect, the set of inapplicable transmission resources may comprise at least one first transmission resource overlapping with at least one scheduled transmission by the second apparatus or at least one scheduled transmission to the second apparatus.

According to an example embodiment of the second aspect, the method may further comprise determining capability information of the second apparatus; and assigning the at least one first transmission resource to the set of inapplicable transmission resources, in response to determining that transmission at the at least one first transmission resource by the second apparatus is hindered due to at least one capability of the second apparatus indicated in the capability information.

According to an example embodiment of the second aspect, the capability information of the second apparatus may be preconfigured, or the method may further comprise: receiving the capability of the second apparatus from the second apparatus or from the third apparatus.

According to an example embodiment of the second aspect, the capability information of the second apparatus may comprise at least one of: an indication of a half-duplex capability, an indication of a half-duplex capability at a sidelink interface, an indication of a half-duplex capability at a radio access network air interface, an indication of whether the second apparatus supports multiple simultaneous transmissions at the sidelink interface, or an indication of whether the second apparatus supports multiple simultaneous transmissions at the radio access network air interface.

According to an example embodiment of the second aspect, the method may further comprise receiving an indication of at least one identifier configured to be used by the second apparatus; and determining the at least one first transmission resource based on sidelink control information indicative of a resource allocation of the at least one scheduled transmission, wherein the at least one scheduled transmission is associated with the at least one identifier configured to be used by the second apparatus.

According to an example embodiment of the second aspect, the at least one scheduled transmission may comprise a hybrid automatic repeat request feedback transmission.

According to an example embodiment of the second aspect, the at least one first transmission resource may comprise at least one physical sidelink feedback channel resource allocated for the hybrid automatic repeat request feedback transmission by the second apparatus.

According to an example embodiment of the second aspect, the method may further comprise assigning the resource allocation of the at least one scheduled transmission, wherein the at least one scheduled transmission is indicated by the sidelink control information, to the set of inapplicable transmission resources, in response to detecting a hybrid automatic repeat request feedback message at the at least a physical sidelink feedback channel resource associated to the sidelink control information indicative of the at least resource allocation of the at least one scheduled transmission.

According to an example embodiment of the second aspect, the method may further comprise obtaining capability information of at least one intended receiver of a sidelink data transmission by the second apparatus; and assigning at least one second transmission resource to the set of inapplicable transmission resources, in response to determining that reception from the at least one second transmission resource by the at least one intended receiver is hindered due to at least one capability indicated in the capability information of the at least one intended receiver.

According to an example embodiment of second aspect, the capability information of the at least one intended receiver may comprise an indication of a discontinuous reception configuration of the at least one intended receiver.

According to an example embodiment of the second aspect, the intended receiver may comprise an apparatus configured to perform the method of the second aspect.

According to an example embodiment of the second aspect, the at least one second transmission resource may comprise at least one sidelink transmission resource allocated for sidelink communication between an apparatus configured to perform the method of the second aspect and the second apparatus.

According to an example embodiment of the second aspect, the at least one intended receiver may comprise a plurality of broadcast or groupcast receivers associated with a network-configured discontinuous reception configuration or a preconfigured discontinuous reception configuration.

According to an example embodiment of the second aspect, the at least one intended receiver may comprise a third apparatus, and the method may further comprise receiving the capability information of the intended receiver from the second apparatus or from the third apparatus.

According to an example embodiment of the second aspect, the method may further comprise receiving an inter-user equipment sidelink coordination request.

According to an example embodiment of the second aspect, the inter-user equipment sidelink coordination request may comprise the at least one identifier configured to be used by the second apparatus, the capability information of the at least one intended receiver, and/or an indication of a priority of the sidelink data transmission.

According to an example embodiment of the second aspect, the method may further comprise assigning the at least one first transmission resource and/or the at least one second transmission resource to the set of inapplicable transmission resources, in response to determining that a priority associated with the at least one first transmission resource and/or the at least one second transmission resource is higher or equal to a threshold.

According to an example embodiment of the second aspect, the threshold may comprise a priority threshold for the priority of the sidelink data transmission.

According to an example embodiment of the second aspect, the method may further comprise assigning the at least one second transmission resource to the set of inapplicable transmission resources, in response to determining that a priority of a sidelink transmission at the at least one second transmission resource to the at least one the intended receiver is lower than a priority of a sidelink transmission at the at least one second transmission resource to the second apparatus.

According to an example embodiment of the second aspect, the method may further comprise assigning the at least one first transmission resource and/or the at least one second transmission resource to the set of inapplicable transmission resources, in response to determining that the at least one first transmission resource and/or the at least one second transmission resource belong to a plurality of periodically allocated transmission resources.

According to an example embodiment of the second aspect, the method may further comprise receiving a transmission from the second apparatus from at least one third transmission resource; and assigning transmission resources associated with the at least one third transmission resource in configuration data of a resource pool from which the transmission is received to the set of inapplicable transmission resources.

According to an example embodiment of the second aspect, the method may further comprise determining the transmission resources associated with the at least one third transmission resource based on at least one resource reservation period indicated in the configuration data of the resource pool.

According to an example embodiment of the second aspect, the set of non-preferred transmission resources may comprise non-preferred transmission resources from a point-of-view of the at least one intended receiver of the second apparatus.

According to a third aspect, a computer program may comprise instructions for causing an apparatus to perform at least the following: determining a set of non-preferred transmission resources for a second apparatus; determining a set of inapplicable transmission resources for the second apparatus; determining a reduced set of non-preferred transmission resources based on excluding at least one of the set of inapplicable transmission resources from the set of non-preferred transmission resources; and transmitting an indication of the reduced set of non-preferred transmission resources to the second apparatus. The computer program may further comprise instructions for causing the apparatus to perform any example embodiment of the method of the second aspect.

According to a fourth aspect, an apparatus may comprise at least one processor and at least one memory including computer program code, the at least one memory and the computer code configured to, with the at least one processor, cause the apparatus at least to: determine a set of non-preferred transmission resources for a second apparatus; determine a set of inapplicable transmission resources for the second apparatus; determine a reduced set of non-preferred transmission resources based on excluding at least one of the set of inapplicable transmission resources from the set of non-preferred transmission resources; and transmit an indication of the reduced set of non-preferred transmission resources to the second apparatus. The computer code may be further configured to cause the apparatus to perform any example embodiment of the method of the second aspect.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Figure 1:
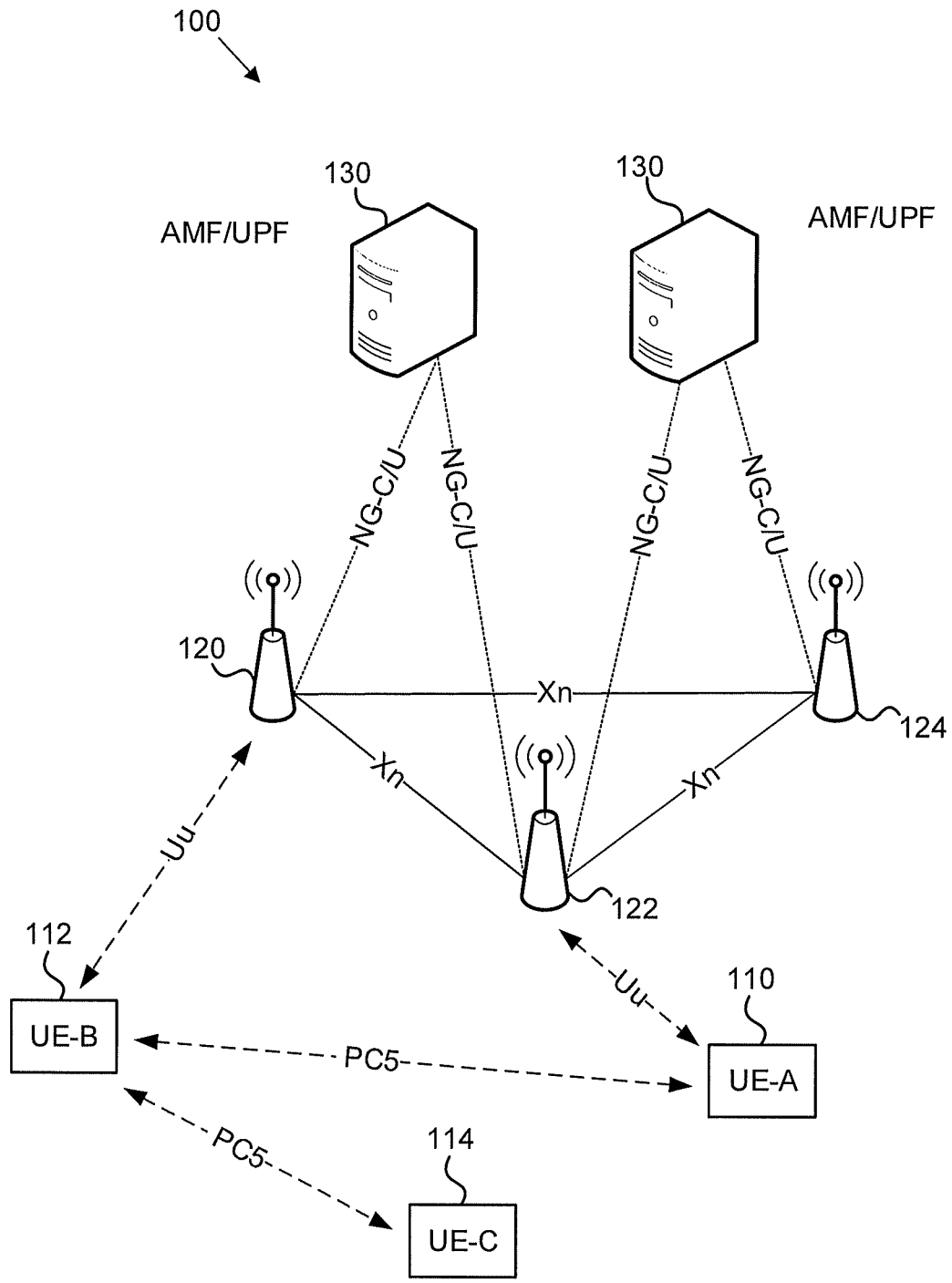
FIG. 1 illustrates an example of a communication network comprising network nodes and devices, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Devices, such as for example user equipment (UE), may be enabled to access services through a radio access network (RAN). In addition, the devices may be enabled to communicate with each other over sidelink connections. Sidelink functionality may be used for example to support advanced vehicle-to-anything (V2X) communications and other new types of services. Example embodiments of the present disclosure may be therefore applied for example to implement advanced V2X services, as well as to support other use cases, for example in public safety, entertainment, and other commercial applications. Power saving, enhanced reliability, and/or reduced latency may be considered as possible advantages in for such use cases. For example, enhanced reliability and reduced latency may enable the system to support of ultra reliable low latency communication (URLLC) type sidelink use cases in various operation scenarios. System level reliability and latency performance of the sidelink may be affected for example by the communication conditions such as for example status of the wireless radio channel and/or the offered load. Some approaches for implementing sidelink communication may not provide sufficiently high reliability and sufficiently low latency, at least in some conditions, for example in case of a busy channel. Therefore, the example embodiments of the present disclosure may enable enhancing reliability and reducing latency, for example in order to better serve use cases requiring low latency and high reliability under such communication conditions.

In order to improve reliability of sidelink transmission, acknowledgement schemes such as for example a hybrid automatic repeat request (HARQ) scheme may be applied. This enables a sidelink transmitter UE to be aware of the reception status of a sidelink receiver UE(s). After the sidelink transmitter UE transmits data on a transmission channel, for example on a physical sidelink control channel (PSCCH) and/or a physical sidelink shared channel (PSSCH), a sidelink receiver UE may indicate its reception status over a feedback channel, for example a physical sidelink feedback channel (PSFCH), associated with the transmission channel resource(s). Data communication between the UEs may be based on a protocol stack comprising multiple interconnected protocol layers, where the different layers may provide different functionality. The HARQ functionality may be implemented for example on the medium access control (MAC) layer. As disclosed herein, characteristics of the HARQ process may be exploited to optimize inter-UE coordination of sidelink transmission resources.

To achieve enhanced reliability and lower latency, inter-UE coordination may be applied in sidelink resource allocation. For example, a set of transmission resources may be determined at a first UE. An indication of the determined set of transmission resources may be sent to a second UE, which may take into account the received resource selection for its own transmission. Such approach may be applied in either in-coverage, partial coverage, or out-of-coverage situations. A transmission resource may comprise a radio channel resource. A transmission resource may be used or allocated for data transmission. A transmission resource may comprise any suitable time-domain resource(s) such as for example time slot(s), transmission tie intervals (TTI), or time domain symbols. Alternatively, transmission resources may comprise frequency domain resources such as for example sub-channels, sub-carriers, or the like. Transmission resources may also comprise time-frequency domain transmission resources such as for example blocks of sub-channels or other frequency domain resources during particular time domain resources. For example, in a time domain only case, if a sidelink time slot is allocated for particular data, then all sub-channels in the sidelink time slot may be allocated to that data. The set of indicated transmission resources may comprise for example contiguous frequency domain resources, non-contiguous frequency domain resources, contiguous time domain resources, or non-contiguous time domain resources.

In an inter-UE coordination scenario, a first UE may determine preferred sidelink transmission resources for a second UE and recommend these transmission resources to the second UE. The second UE may select its sidelink transmission resources based on the transmission resources recommended by the first UE. This scheme may be enhanced to indicate non-preferred transmission resources instead, or in addition to, the preferred transmission resources. Example embodiments of the present disclosure enable signaling of the non-preferred transmission resources to the second UE with a low signaling overhead.

According to an example embodiment, an apparatus may determine a set of non-preferred transmission resources ($S_{NPR,R}$) for a second apparatus. The set $S_{NPR,R}$ may comprise non-preferred transmission resources form the point-of-view of an intended receiver, which may be the apparatus itself or a third apparatus. The apparatus may further determine a set of inapplicable transmission resources ($S_{NPR,B}$) for the second apparatus. The set $S_{NPR,B}$ may comprise transmission resources, which the second apparatus would not use regardless of whether they are indicated as non-preferred transmission resources to the second apparatus. The set $S_{NPR,B}$ may therefore comprise transmission resource(s) that are inapplicable by the second apparatus. The apparatus may determine a reduced set of non-preferred transmission resources ($S_{NPR,O}$) based on excluding at least one of the set of inapplicable transmission resources ($S_{NPR,B}$) from the set of non-preferred transmission resources ($S_{NPR,R}$). The apparatus may transmit an indication of the reduced set of non-preferred transmission resources ($S_{NPR,O}$) to the second apparatus. Overhead of signaling non-preferred transmission resources may be thereby reduced. Furthermore, various methods for determining the sets of non-preferred and inapplicable sets ($S_{NPR,R}$, $S_{NPR,B}$) are disclosed.

FIG. 1 illustrates an example of a communication network comprising network nodes and devices, according to an example embodiment. The communication network 100 may comprise one or more core network elements, such as for example access and mobility management function (AMF) and/or user plane function (UPF) 130, and one or more base stations 120, 122, 124. The base stations may for example comprise 5G base stations (gNB). The communication network 100 may further comprise one or more devices, which may be referred to as user nodes or user equipment (UE). A UE may comprise for example a vehicle, a mobile phone, or any other device able or unable to communicate with the base stations 120, 122, 124.

As illustrated in FIG. 1, the communication network 100 may comprise a number of user equipments, UE-A 110, UE-B 112, and/or UE-C 114, as non-limiting example. Any of the UEs 110, 112, 114 may be configured to operate as a sidelink transmitter and/or a sidelink receiver. The communication network 100 may be configured for example in accordance with the 5$^{th}$ generation digital cellular communication network, as defined by the 3rd Generation Partnership Project (3GPP). In one example, the communication network 100 may operate based on 3GPP 5G NR (5G New Radio). It is however appreciated that example embodiments presented herein are not limited to this example network and may be applied in any present or future wireless or wired communication networks, or combinations thereof, for example other type of cellular networks, short-range wireless networks, broadcast or multicast networks, or the like.

The UEs 110, 112, 114 may communicate with zero or more of the base stations 120, 122, 124 via wireless radio channel(s), for example over an Uu interface of 3GPP standards. The Uu interface is provided as an example of a RAN air interface. The base stations 120, 122, 124 may communicate with one or more other base stations over a base station interface, such as for example an Xn interface of 3GPP standards. Furthermore, the UE-B 112 may communicate with the UE-A 110 and/or the UE-C 114 over sidelink interface(s) or connection(s), for example over a PC5 interface of 3GPP standards. A sidelink connection may be a direct radio (air interface) connection between the UEs. The UE-B 112 may act as a link between the base station 120 and UE-A 110 or UE-C 114.

The base stations 120, 122, 124 may be configured to communicate with the core network elements over a communication interface, such as for example a control plane interface or a user plane interface NG-C/U as defined by 3GPP standards. The base stations may be also called radio access network (RAN) nodes and they may be part of a radio access network between the core network and the UEs 110, 112, 114. Functionality of a base station may be distributed between a central unit (CU), for example a gNB-CU, and one or more distributed units (DU), for example gNB-DUs. Network elements AMF/UPF, gNB, gNB-CU, and gNB-DU may be generally referred to as network nodes or network devices. Although depicted as a single device, a network node may not be a stand-alone device, but for example a distributed computing system coupled to a remote radio head. For example, a cloud radio access network (cRAN) may be applied to split control of wireless functions to optimize performance and cost.

A sidelink interface may be designed to facilitate a UE to communicate with other nearby UE(s) via sidelink communication over direct radio connection, which may be a line-of-sight connection or a non-line-of-sight connection. Sidelink resource allocation may be performed based on different resource allocation modes. A sidelink transmitter (Tx) UE may be configured with one of the modes to perform its sidelink transmissions. The sidelink resource allocation modes may include a first resource allocation mode (Mode 1), an example of which is NR SL Mode 1, and a second sidelink resource allocation mode (Mode 2), an example of which is NR SL Mode 2. In Mode 1, sidelink transmission resource(s) may assigned by the network (NW), e.g. via a base station, to the sidelink transmitter UE.

In Mode 2, a sidelink transmitter UE may autonomously select its sidelink transmission resources. For example, in an inter-UE coordination scenario, the UE-A 110 may select preferred sidelink transmit resource(s), for example based on sensing performed by the UE-A 110. The UE-A 110 may then recommend the selected resource(s) to the UE-B 112, which may select its sidelink transmit resource(s) by taking into account the resource(s) indicated by the UE-A 110. For example, the UE-B 112, which may operate as a sidelink transmitter, may use the recommended resource(s) to transmit to the UE-A 110, which may operate as a sidelink receiver. Thus, by using the inter-UE coordination scheme, UE-A 110 may try to ensure that there is no packet collision or strong interference on the selected resource(s) and therefore reliability of the transmission from the UE-B 112 to the UE-A 110 may be improved. Example embodiments of the present disclosure may be applied for example in response to determining that the UE-A 110 operates in Mode 2.

Figure 2:
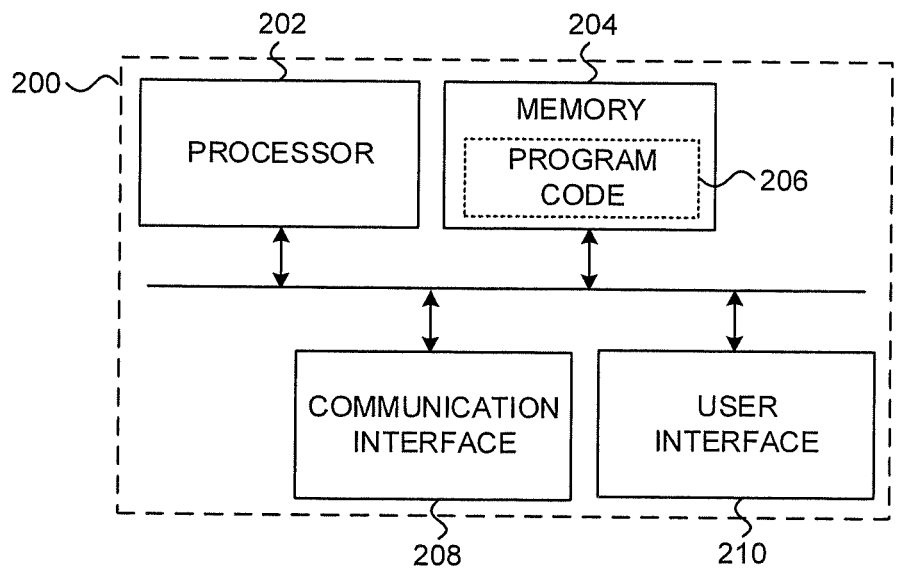
FIG. 2 illustrates an example of an apparatus configured to practice one or more example embodiments.

FIG. 2 illustrates an example embodiment of an apparatus 200, for example UE-A 110, UE-B 112, UE-C 114, or any of the base stations 120, 122, 124. The apparatus 200 may comprise at least one processor 202. The at least one processor 202 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus 200 may further comprise at least one memory 204. The at least one memory 204 may be configured to store, for example, computer program code or the like, for example operating system software and application software. The at least one memory 204 may comprise one or more volatile memory devices, one or more non-volatile memory devices, and/or a combination thereof. For example, the at least one memory 204 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

The apparatus 200 may further comprise a communication interface 208 configured to enable apparatus 200 to transmit and/or receive information to/from other devices. In one example, apparatus 200 may use communication interface 208 to transmit or receive signaling information and data in accordance with at least one cellular communication protocol. The communication interface may be configured to provide at least one wireless radio connection, such as for example a 3GPP mobile broadband connection (e.g. 3G, 4G, 5G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. The communication interface 208 may comprise, or be configured to be coupled to, at least one antenna to transmit and/or receive radio frequency signals. One or more of the various types of connections may be also implemented as separate communication interfaces, which may be coupled or configured to be coupled to one or more of a plurality of antennas.

The apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus 200 is configured to implement some functionality, some component and/or components of the apparatus 200, such as for example the at least one processor 202 and/or the at least one memory 204, may be configured to implement this functionality. Furthermore, when the at least one processor 202 is configured to implement some functionality, this functionality may be implemented using the program code 206 comprised, for example, in the at least one memory 204.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The apparatus 200 may comprise means for performing one or more example embodiments described herein. In one example, the means comprises the at least one processor 202, the at least one memory 204 including program code 206 configured to, when executed by the at least one processor, cause the apparatus 200 to perform the example embodiment(s).

The apparatus 200 may comprise for example a computing device such as for example a base station, a server, a mobile phone, a tablet computer, a laptop, an internet of things (IoT) device, or the like. Examples of IoT devices include, but are not limited to, consumer electronics, wearables, sensors, and smart home appliances. In one example, the apparatus 200 may comprise a vehicle such as for example a car. Although apparatus 200 is illustrated as a single device it is appreciated that, wherever applicable, functions of the apparatus 200 may be distributed to a plurality of devices, for example to implement example embodiments as a cloud computing service.

Figure 3:
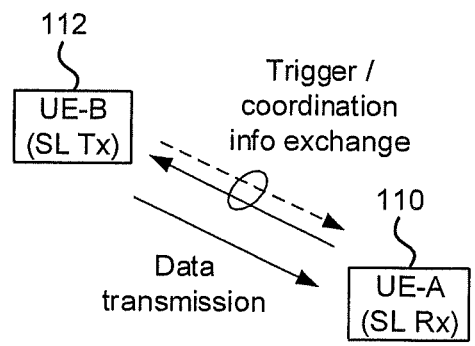
FIG. 3 illustrates an example of inter-UE coordination of transmission resources, where a coordinating UE is also an intended receiver, according to an example embodiment.

FIG. 3 illustrates an example of inter-UE coordination of transmission resources, where a coordinating UE is also an intended receiver, according to an example embodiment. Coordination information may be exchanged between the UE-A 110 and the UE-B 112 for allocating sidelink transmission resources for the UE-B 112 (SL Tx). In this example, the coordinating UE (UE-A 110) operates as the sidelink receiver (SL Rx). Exchange of the coordination information may be in response to detecting a trigger at the UE-A 110 for performing inter-UE coordination for allocating sidelink transmission resources. The UE-A 110 may detect the triggering for example by detecting a predetermined or (pre)configured triggering condition. The triggering condition may comprise for example a certain number of successive NACK messages associated with currently used transmission resource(s), latency exceeding a threshold, not having sufficient sensing information, or a quality-of-service (QoS) level of the transmission exceeding a threshold. A trigger may also comprise a trigger message transmitted by the UE-B, for example via radio resource control (RRC) signaling, a MAC control element (CE), SCI, and/or PSFCH signaling. Subsequently, data transmission may occur from the UE-B 112 to the UE-A 110.

Figure 4:
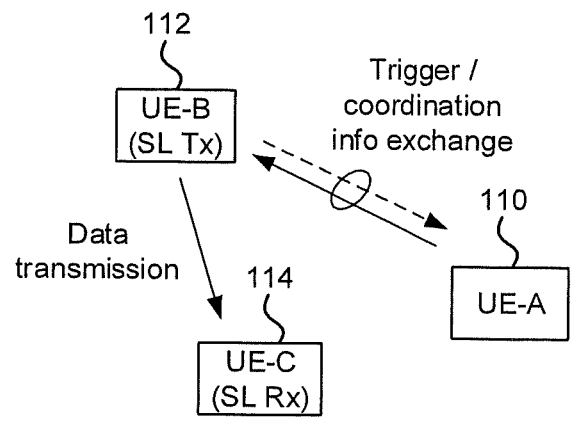
FIG. 4 illustrates an example of inter-UE coordination of transmission resources, where an intended receiver is different from a coordinating UE, according to an example embodiment.

FIG. 4 illustrates an example of inter-UE coordination of transmission resources, where an intended receiver is different from a coordinating UE, according to an example embodiment. Similar to the example of FIG. 3, coordination information may be exchanged between the UE-A 110 and the UE-B 112 for allocating sidelink transmission resources for the UE-B 112 (SL Tx). In this example, a third UE (UE-C 114) operates as the sidelink receiver (SL Rx). Exchange of the coordination information may be again in response to detecting a trigger at the UE-A 110 for performing inter-UE coordination for allocating sidelink transmission resources. Since the UE-C 114 is the intended sidelink receiver, data transmission may subsequently occur from the UE-B 112 to the UE-C 114. In another example, it is possible to have both UE-A 110 and UE-C 114 as the sidelink receivers for the data transmission from UE-B 112.

In Mode 2, a sidelink transmitter UE, e.g. UE-B 112, may perform a sensing procedure over configured sidelink transmission resource pool(s), in order to obtain knowledge of transmission resource(s) reserved by other nearby sidelink transmitter UE(s). A resource pool may comprise a set of transmission or reception resources assigned to the sidelink operation, for example as subframes/slots or resource block(s)/subchannel(s). A set of transmission resources may comprise one or a plurality of transmission resources. Based on the knowledge obtained by the sensing, the sidelink transmitter UE may select transmission resource(s) from the available sidelink resources. In order to perform sensing and obtain the necessary information to receive a SL transmission, the sidelink transmitter UE may decode associated signaling information, for example from the sidelink control information (SCI). Examples possible information fields included in such signaling information are provided below. This type of information may be included in sidelink control information, as in the following example, or in any other suitable signaling information. The various information fields may be also distributed between different types of signaling information.

The SCI associated with a data transmission may be divided into a $1^{st}$ stage SCI and $2^{nd}$ stage SCI. The $1^{st}$ SCI may be further include SCI Format 1-A. The SCI format 1-A may be used for the scheduling of $2^{nd}$ stage SCI and data on the PSSCH. The SCI Format 1-A, or in general the SCI, may comprise one or more of the following signaling fields:

Priority: This field may indicate a priority of the data transmission. The priority level may be used to enable different treatment of service data (e.g. V2X data) across different modes of communication, e.g. broadcast, groupcast, or unicast. If quality-of-service (QoS) requirements can not be fulfilled for all the sidelink (e.g. PC5) service data, for example associated with a particular PC5 reference point, the priority level may be used to select for which sidelink service data the QoS requirements are prioritized. For example, service data packet with priority level value N may be prioritized over a service data packet with higher priority level value, e.g. N+1, N+2 etc., where lower number is used to indicate higher priority.

Frequency resource assignment: This field may indicate frequency resources allocated to the data transmission.

Time resource assignment: This field may indicate time resources allocated to the data transmission.

Resource reservation period: This field may indicate periodicity of the resource assignment(s).

Demodulation reference signal (DMRS) pattern. This field may indicate a pilot pattern associated with the data transmission.

$2^{nd}$-stage SCI format. This field may indicate a format of the $2^{nd}$-stage SCI, for example SCI Format 2-A or SCI Format 2-B.

Beta_offset indicator. This field may indicate a beta_offset for a hybrid automatic repeat request process associated with the data transmission.

Number of DMRS port(s). This field may indicate the number of antenna ports for DMRS associated with the data transmission.

Modulation and coding scheme (MCS). This field may indicate a modulation and/or a forward error correction coding scheme for the data transmission.

Additional MCS table indicator. This field may indicate use of an additional MCS table for the data transmission.

Physical sidelink feedback channel (PSFCH) overhead indication

The SCI format 2-A may be used for the decoding of PSSCH, with HARQ operation when HARQ-ACK (acknowledgement) information includes ACK (acknowledgement) or NACK (negative ACK), or when there is no feedback of HARQ-ACK information. The SCI Format 2-A, or in general the SCI or the $2^{nd}$ stage SCI format, may comprise one or more of the following signaling fields:

HARQ process number. This field may identify a HARQ process associated with the data transmission.

New data indicator. This field may indicate whether the data transmission is a new transmission, for example for triggering flushing of a HARQ buffer.

Redundancy version. This field may indicate a version of redundancy information, for example for incremental redundancy applied in connection with the HARQ process.

Source ID. This field may identify a sidelink transmitter UE associated with the data transmission.

Destination ID. This field may identify a sidelink receiver UE associated with the data transmission.

HARQ feedback enabled/disabled indicator. This field may indicate whether HARQ feedback is enabled or disabled for the data transmission.

Cast type indicator. This field may indicate the type of the data transmission, for example broadcast, groupcast, or unicast.

CSI request. This field may indicate a request for providing channel state information (CSI).

The SCI format 2-B may be used for the decoding of PSSCH, with HARQ operation when HARQ-ACK information includes only NACK, or when there is no feedback of HARQ-ACK information. The SCI Format 2-B, or in general the SCI or the $2^{nd}$ stage SCI format, may comprise one or more of the following signaling fields:

HARQ process number. This field may identify a HARQ process associated with the data transmission.

New data indicator. This field may indicate whether the data transmission is a new transmission, for example for flushing a HARQ buffer.

Redundancy version. This field may indicate a version of redundancy information, for example for incremental redundancy applied in connection with a HARQ process.

Source ID. This field may identify a sidelink transmitter UE associated with the data transmission.

Destination ID. This field may identify a sidelink receiver UE associated with the data transmission.

HARQ feedback enabled/disabled indicator. This field may indicate whether HARQ feedback is enabled or disabled for the data transmission.

Zone ID. This field may identify a zone associated with the data transmission.

Communication range requirement. This field may indicate a required range of communication for the data transmission.

Thus, information relevant for sensing purposes may be obtained based on receiving the SCI. For example, a sidelink transmitter UE may send a $1^{st}$ stage SCI and indicate reserved sidelink resources to nearby UEs, for example by using the fields Resource reservation period, Time resource assignment and/or Frequency resource assignment. Hence, the nearby UEs may avoid using the resources reserved by the sidelink transmitter UE providing the SCI. The SCI may further comprise information for identifying a sidelink receiver UE that is intended to receive the data transmission (data payload). The intended sidelink receiver UE may be determined for example based on the Destination ID carried in the $2^{nd}$ stage SCI.

As noted above, in the inter-UE coordination scenario the UE-A 110 may send to the UE-B 112 the set of resources non-preferred for UE-B's 112 transmission. The set of non-preferred resources may be determined by the UE-A 110 for example based on its sensing result (e.g. based on the received SCI), and/or expected or potential resource conflict(s). In general, the non-preferred resources may comprise any transmission resources for which a risk of unreliable communication is determined. For example, if the intended receiver operates in a half-duplex mode, the non-preferred transmission resources may include resources at which the intended received is excepted or determined to be transmitting. The non-preferred transmission resources may further comprise resources where the intended received is expected or determined to be unavailable, for example due to a discontinuous reception (DRX) cycle off-period, or the like. The non-preferred transmission resources may further include resources scheduled for other transmissions to the intended receiver. Such transmissions may be determined for example based on the semi-persistent scheduling (SPS) information. The non-preferred transmission resources may be further determined based on expected interference, for example due to transmission(s) by other UEs. It is further noted that even though some example embodiments have been described with reference to a single intended receiver, similar embodiments may be applied also a plurality of intended receivers, for example in broadcast or groupcast operation.

For example, upon being triggered and after acquiring the information about the non-preferred transmission resources, the UE-A 110 may send the information about the non-preferred transmission resources to the UE-B 112, which may take into account the non-preferred transmission resources when selecting in which resources to transmit to its intended receiver. If the UE-A 110 is the intended receiver of UE-B 112, the UE-A 110 may be aware of its own non-preferred transmission resources. However, if the intended receiver is the UE-C 114, the UE-A 110 may acquire at least part of this information from the UE-C 114. This may be done implicitly, for example based on UE-A's 110 sensing of the relevant transmission resource pool. Alternatively, or additionally, the UE-A 110 may acquire the information about the non-preferred transmission resources by explicit signaling. For example, the UE-C 114 may transmit an indication of its non-preferred resources to the UE-A 110 or provide its ID(s) (e.g. Source ID and/or Destination ID) to the UE-A 110 in order to facilitate the sensing operation and identification of non-preferred resources of the UE-C 114 by the UE-A 110 to the UE-B 112.

The number of bits required to indicate the non-preferred resources may depend at least on the following factors: (i) how far forward in time can the non-preferred resources be indicated, and (ii) how many non-preferred resources may be indicated. While the first factor (i) may be expected to depend on either the resource pool configuration or a potential resource selection interval derived by the UE-A 110 itself or indicated from the UE-B 112 to the UE-A 110, the second factor (ii) may depend only on the number of non-preferred resources in the selection interval.

Since one design goal in sidelink communication may be to minimize the over-the-air signaling overhead, it may be desirable to minimize the number of bits used for indicating the non-preferred transmission resources. An efficient approach for this is to reduce the number of non-preferred resources that are indicated to the sidelink transmitter. Therefore, example embodiments of the present disclosure may enable reducing the set of non-preferred resources indicated to the sidelink transmitter.

Figure 5:
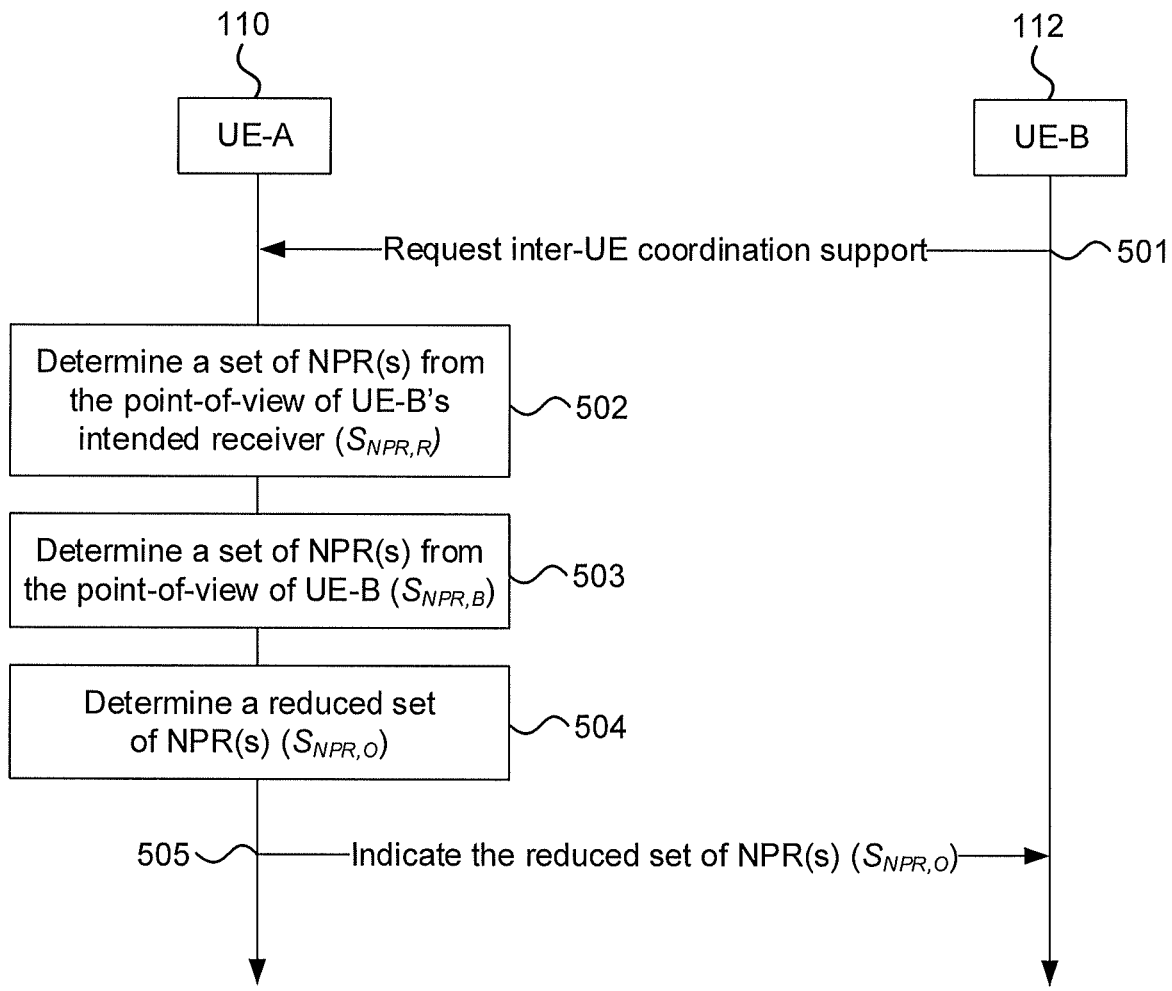
FIG. 5 illustrates an example of communication and operations at two UEs, according to an example embodiment.

FIG. 5 illustrates an example of communication and operations at two UEs, according to an example embodiment. The UE-A 110 may act as a coordinating UE that indicates non-preferred transmission resources to the UE-B 112, which may operate as a sidelink transmitter. The UE-B 112 may be also referred to as a second UE. The UE-A 110 may operate as a sidelink receiver and be the intended receiver of UE-B's 112 transmission. Alternatively, the UE-A 110 may not be an intended receiver of the UE-B's 112 transmission. Instead, a third UE (not shown), for example UE-C 114, may operate as the intended receiver of the UE-B's 112 transmission. The example of FIG. 5 enables the UE-A 110 to exclude from signaling the NPR(s) transmission resource(s) that are anyway inapplicable.

At operation 501, UE-B 112 may transmit an inter-UE sidelink coordination request to the UE-A 110. Hence, UE-B 112 may request inter-UE coordination support from the UE-A 110. The request may comprise various signaling information associated with the sidelink coordination. Alternatively, such signaling information may be transmitted by the UE-B 112 to the UE-A 110 separately, for example in any suitable control message(s) such as for example radio resource control (RRC) message(s), MAC CE(s), SCI, and/or PSFCH signaling. The signaling information may include an indication of identity(ies) or identifier(s) configured to be used by the UE-B 112. The identity(ies) or identifier(s) may for example include Layer 1 (L1) identifier(s) of the UE-B 112 included in the sidelink control information (SCI), for example in the $2^{nd}$ stage SCI (e.g. Source ID and/or Destination ID). In one option, the identity(ies) or identifier(s) indicated by the UE-B 112 may be different from the identity(ies) or identifier(s) used by the UE-B 112 to communicate with the UE-A 110. Additionally or alternatively, the identity(ies) or identifier(s) may be the identity(ies) or identifier(s) used by the UE-B 112 to communicate with the UE-A 110. The signaling information may further comprise an indication of a priority of a sidelink data transmission that is to be coordinated by the UE-A 110. The priority information may be used to determine whether certain transmission resource(s) are inapplicable by the UE-B 112 regardless of signaling of NPR(s) to the UE-B 112 by the UE-A 110.

Alternatively, or additionally, the signaling information may include further capability information of the UE-B 112, such as for example indication(s) of duplex capability (e.g. half/full) with respect to one or more communication interfaces. The capability information of the UE-B 112 may for example include an indication of a half-duplex capability (applicable generally to both sidelink and RAN interface), an indication of a half-duplex capability at the sidelink interface, an indication of a half-duplex capability at a RAN interface, an indication of a whether the UE-B 112 supports multiple simultaneous transmissions at the sidelink interface, or an indication of whether the UE-B 112 supports multiple simultaneous transmissions at the RAN interface. An indication of whether multiple simultaneous transmissions are supported may comprise an indication of a single sub-channel transmission capability, for example with respect to the sidelink interface and/or the RAN interface. Based on a single sub-channel capability indication, the UE-A 110 may determine that the UE-B 112 does not support multiple simultaneous transmissions at the corresponding interface. The UE-A 110 may then assign transmission resource(s) to the set of inapplicable transmission resource(s) accordingly. The sidelink interface may comprise the PC5 interface between sidelink UEs. The RAN interface may comprise a RAN air interface, for example the Uu interface between the UE-B 112 and the base station 120. The duplex capability information may be used to determine whether use certain transmission resources is hindered by other scheduled receptions by the UE-B 112, as will be further described below. The UE-A 110 may receive the information or message(s) transmitted by the UE-B 112, e.g. over a PC5 RRC message and/or MAC CE. In one option, at least part of the capability information of the UE-B 112 may be also provided by SCI. Hence, the capability information of the UE-B 112 may in general comprise any applicable signaling field of the SCI and/or upper layer message, e.g. PC5 RRC message and/or MAC CE. In addition, the capability information of the UE-B 112 may further indicate if UE-B 112 supports multiple transmissions simultaneously. This capability information may be used to determine whether use of certain transmission resources is hindered by other scheduled transmissions by the UE-B 112, as will be further described below. The capability information of the UE-B 112 may be also provided to the UE-B 112 by a third UE, for example the UE-C 114. The UE-A 110 may in general determine capability information of the UE-B 112. This may comprise retrieving preconfigured capability information of the UE-B 112 from the memory of the UE-A 110. Preconfigured capability information may be for example stored in the memory in accordance with a technical specification enabling the sidelink communication. Determining the capability information may also comprise receiving the capability information of the UE-B 112 form the UE-B 112 or the third UE, for example the UE-C 114.

The UE-A 110 may further obtain capability information of an intended receiver of the UE-B's 112 transmission. If the UE-A 110 is also the intended receiver, the capability information may be preconfigured at the UE-A 110 or the capability information may be network-configured. Hence, obtaining the capability information of the intended receiver may comprise retrieving the capability information from a memory of the UE-A 110 or receiving a configuration message from the network, for example via the base station 122.

However, if the UE-A 110 is not the intended receiver, the capability information of the intended receiver (e.g. UE-C 114) may be received from the UE-B 112 or the UE-C 114, for example included in the inter-UE sidelink coordination request (501) or other control message(s), e.g. (PC5) RRC message(s). The capability information of the intended receiver may for example comprise a discontinuous reception (DRX) cycle of the intended receiver. This information may be used by UE-A 110 to determine whether reception from certain transmission resource(s) is hindered due to the active status of the intended receiver, as will be further described below. In one option, at least part of the capability information of the intended receiver may be also provided by SCI. Hence, the capability information of the intended receiver may in general comprise any applicable signaling field of the SCI and/or upper layer message, e.g. PC5 RRC message and/or MAC CE. In addition, the capability information of the intended receiver may further indicate if the intended receiver supports multiple transmissions simultaneously. This capability information may be used to determine whether use of certain transmission resources is hindered by other scheduled transmissions by the intended receiver, as will be further described below In response to receiving the request for inter-UE sidelink coordination, or in response to being triggered otherwise, the UE-A 110 may acquire information about non-preferred resources, for example based on sensing as described above.

In another example, the UE-A 110 may acquire information about non-preferred resources based on the scheduled transmissions from the intended receiver, wherein a non-preferred resource is a transmit resource that would cause half-duplex issue at the intended receiver. This initial set of NPR(s) may be used as a basis for determining the reduced set of NPR(s) based on excluding the transmission resources determined to be inapplicable.

At operation 502, the UE-A 110 may identify a set of NPR(s) from the point-of-view of UE-B's 112 intended receiver(s). This set of NPR(s) may be denoted by $S_{NPR,R}$. The set $S_{NPR,R}$ may be determined for example by assigning to it transmission resources overlapping with already scheduled sidelink transmissions to/from the intended receiver. The UE-A 110 may further determine to assign transmission resource(s) to $S_{NPR,R}$ based on the capability information of the intended receiver. For example, transmission resource(s) may be assigned to $S_{NPR,R}$, in response to determining that reception from the transmission resource(s) by the intended receiver is hindered due to capability(ies) of the intended receiver. The capability(ies) of the intended receiver may comprise a capability(ies) indicated in the capability information received from the UE-B 112 or otherwise known to the UE-A 110. An example of a capability of the intended received is its DRX configuration, e.g. DRX ON/OFF period(s), which may be contained for example in received assistance information. For example, the UE-A 110 may assign transmission resource(s) occurring during a DRX OFF period of the intended receiver to $S_{NPR,R}$.

At operation 503, the UE-A 110 may identify a set of NPR(s) from the point-of-view of UE-B 112. This set of NPR(s) may be denoted by $S_{NPR,B}$. The set $S_{NPR,B}$ may be determined for example based on information about scheduled sidelink transmissions to/from the UE-B 112 or transmissions between the UE-B 112 and the base station 120. Hence, the UE-A 110 may include in the set $S_{NPR,B}$ transmission resource(s) overlapping with scheduled transmission(s) by the UE-B 112 or to the UE-B 112. This enables to reduce the amount of NPR signaling by utilizing the knowledge of overlapping transmissions to/from the UE-B 112.

The UE-A 110 may further determine transmission resource(s) to be included in $S_{NPR,B}$ based on the capability information of the UE-B 112. According to an example embodiment, the UE-A 110 may determine to include transmission resource(s) to the set of inapplicable transmission resources, in response to determining that transmission at certain transmission resource(s) by the UE-B 112 are hindered due to capability(ies) of the UE-B 112. This enables to take into account capabilities of the UE-B 112 when determining whether overlapping transmissions actually hinder sidelink transmissions to/from the UE-B 112. The capability(ies) may be indicated in the capability information of the UE-B 112. For example, the UE-A 110 may determine that there are overlapping scheduled transmission(s) at time(s) at which the UE-B 112 has other transmission(s)/reception(s), for example future reserved transmission(s)/reception(s) at existing pre-reserved resource(s), and due to power limitations or other UE capability restrictions such as half-duplex capability, the UE-B 112 is unable to perform an additional sidelink transmission, for example on another sub-channel. If the UE-B 112 is limited to half-duplex operation, the UE-A 110 may determine that there are overlapping scheduled transmission(s) at time(s) at which the UE-B 112 has a (future reserved) reception scheduled, for example at the same or another PC5 resource pool.

In one embodiment, if the UE-A 110 has received data or coordination request from the UE-B 112 at a time slot $t'^{SL}_m$, the UE-A 110 may include time resource(s) $t'^{SL}_y$, containing time-and-frequency resource(s) $R_{x,y}$ in $S_{NPR,B}$, if, for any periodicity value allowed by the higher layer parameter sl-ResourceReservePeriodList configured for the resource pool from which the UE-A 110 has received the data or the coordination request from the UE-B 112, and for a hypothetical SCI format 1-A received in slot $t'^{SL}_m$ with 'Resource reservation period' field set to that periodicity value and indicating all subchannels of the resource pool in this slot, condition c) in step 6 in section 8.1.4 of ETSI TS 38.214 v.16.4.0 (2021-01) would be met. Basically, in Mode 2, upon the UE-A 110 receives (e.g. a coordination request message or a data message) from the UE-B 112 at time slot $t'^{SL}_m$, the UE-B 112 would not have sensing result for that slot due to its half-duplex problem. Thus, the UE-B 112 would assume there is periodic resource reservation indicated in that slot corresponding to all possible allowed reserved periods for that resource pool, and exclude using the reserved slots for UE-B's 112 future transmissions. Thus, the UE-A 110 may determine the inapplicable transmission (time) resources for the UE-B 112, based on the time where the UE-A 110 received a transmission from the UE-B 112 (e.g. data and/or coordination request message) and the configuration of the resource pool(s) from which the UE-A 110 received the transmission from UE-B, e.g. parameter sl-ResourceReservePeriodList in the resource pool configuration.

Therefore, in general the UEA 110 may assign to $S_{NPR,B}$ transmission resource(s) which are associated with the resource(s) from which the data transmission from the UE-B 112 was received. The associated transmission resources may be determined based on configuration data of the resource pool from which the data transmission was received. For example, the associated transmission resources may be determined based on the ResourceReservePeriodList (or in general resource reservation period(s) indicated in the configuration data of that resource pool. The UE-A 110 may for example assign to $S_{NPR,B}$ transmission resource(s) occurring during the indicated resource reservation periods. For example, for resource selection in Mode 2, the UE-B 112 may perform sensing in order to identify the resources reserved by other nearby UEs. However, if the UE-B 112 is transmitting at time $t_m$, it may not be able to perform sensing due to its half-duplex capability In this case, the UE-B 112 may assume there would be an SCI occurring at time $t_m$ which is missed due to the half-duplex capability, and the missed SCI would reserve the sidelink resources in all the possible periods indicated for example in information element (IE) ResourceReservePeriod. For example, if only 10 ms periodicity is allowed (in principle there could be more allowed periodicity values configured, for example by signaling field sl-ResourceReservePeriodList), the UE-B 112 may assume the resources in $t_{m+10}$, $t_{m+10\times2}$, etc. are occupied. Thus, the UE-B 12 would not select a new resource from any of those slots.

In case of the RAN interface, the UE-A 110 may determine that there are overlapping transmission scheduled at time(s) at which the UE-B 112 has reception at the RAN interface. This may be determined for example by detecting that a transmission is scheduled to the UE-B 112 at the Uu interface.

The above transmission resource conflicts may be known or determined by the UE-B 112. There may be however some sidelink half-duplex capability restricted transmission resources that the UE-B 112 may not be aware of. For example, it is possible that an original transmission to UE-B 112 can not be successfully decoded by the UE-B 112, for example due to interference or other resource conflicts, and hence an indication of future transmission resources included in that original transmission may be lost. Therefore, the UE-B 112 may not be aware of the indicated future transmissions resources.

In general, the UE-A 110 may obtain information about the inapplicable transmission resources due to concurrent transmission and/or half-duplex capability at the sidelink interface based on monitoring SCIs, for example in configured sidelink resource pool(s), if the UE-A 110 is aware of the identity(ies)/ID(s) used by the UE-B 112 to communicate with other sidelink peer UEs. As noted above, the UE-B 112 may send its ID list and/or its sidelink UE capability information to the UE-A 110. This information may be used by the UEA 110 to self-derive the resource set $S_{NPR,B}$, as described herein.

For example, the UE-A 110 may determine transmission resource(s) to be included in $S_{NPR,B}$ based on SCI indicative of a resource allocation of scheduled transmission(s) that is associated with identifier(s) (ID) configured to be used by the UEB 112. For example, based on detecting identifier(s) used by UE-B 112, for example from the $2^{nd}$ stage SCI during physical sidelink control channel (PSCCH) or physical sidelink shared channel (PSSCH) reception at the UE-A 110, the UE-A 110 may check the resource reservation information, for example in the $1^{st}$ stage SCI associated to the $2^{nd}$ stage SCI, and determine the transmission resource(s) reserved for the UE-B 112 to transmit or receive data from a sidelink peer UE. Thus, UE-A 110 may determine that the reserved resource(s) will be naturally (i.e. without being indicated to the UE-B 112 by UE-A 110) considered by UE-B 112 as non-preferred transmission resource(s), since the UE-B 112, as the transmitter UE or the receiver UE of the SCI, would be configured to avoid simultaneous transmissions and/or simultaneous transmission and reception by itself. This enables to avoid signaling of some non-preferred transmission resources from the UE-A 110 to the UE-B 112. Thus, the UE-A 110 may include the determined transmission resource(s) in $S_{NPR,B}$. The overlapping scheduled transmission may therefore comprise either a concurrent transmission at the sidelink interface (e.g. PC5) or the RAN interface (e.g. Uu). In one embodiment, the UE-A 110 may further check the priority value carried in the SCI associated with the identifier(s) (ID) configured to be used by the UEB 112 to determine if resource(s) reserved by the SCI should be considered as inapplicable resource(s). In one example, the UE-A 110 may also know the priority of the UE-B's 112 data transmission to be coordinated, e.g. based on the coordination request message from the UE-B 112, or the UE-A's 110 monitoring/receiving from the UE-B's 112 communication in the past. In this case, if the SCI reserving the resource(s) indicates a higher priority than the UE-B's 112 data transmission to be coordinated, the UE-A 110 may consider the resource(s) reserved by the SCI as inapplicable resource(s), since the UE-B 112 would prioritize its communication with the higher priority in the reserved resource(s).

According to an example embodiment, the scheduled transmission(s) may comprise HARQ feedback transmission(s). The UE-A 110 may detect SCI addressed to the UE-B 112. The SCI may indicate enablement of HARQ feedback. The SCI may further comprise an indication of future transmission resource(s) reserved for (re-)transmission(s) towards the UE-B 112. The UE-A 110 may determine the corresponding HARQ feedback resource(s), for example on the physical sidelink feedback channel (PSFCH), that are associated with the reserved transmission resource(s). The determined PSFCH resource(s) may be subsequently used by the UE-B 112 to transmit its HARQ feedback(s). UE-A 110 may therefore include the transmission resource(s), for example time-domain resource(s) such as sidelink time slots, containing the determined PSFCH resource(s) into $S_{NPR,B}$. Hence, the transmission resource(s) included in $S_{NPR,B}$ may comprise PSFCH resource(s) allocated for HARQ feedback by the UE-B 112. This may be done for example in response to determining that UE-B 112 has limited UE capability to support simultaneous transmissions, and/or in response to detecting an indication of HARQ enablement in the sidelink control information addressed to the UE-B 112. This enables to avoid NPR signaling of transmission resources inapplicable due to a HARQ process at the UE-B 112 and thereby to further improve efficiency of NPR signaling.

According to an example embodiment, the UE-A 110 may include the determined PSFCH resource(s) to $S_{NPR,B}$, in response to detecting a HARQ feedback message at the PSFCH resource(s). The HARQ feedback message may comprise an acknowledgement message (ACK) or a negative acknowledgement message (NACK). For example, if the UE-A 110 detects that the UE-B 112 is the sidelink receiver UE of a considered SCI and HARQ feedback is enabled based on the considered SCI, the UE-A 110 may include the determined reserved resource(s) in $S_{NPR,B}$, only if an HARQ ACK/NACK is detected at the PSFCH resource(s) associated to the considered SCI. In other words, the UE-A 110 may include in $S_{NPR,B}$ a resource allocation of scheduled transmission resource(s) indicated by the SCI, in response to detecting the HARQ feedback message at PSFCH resource(s) that are associated to the SCI indicative of the resource allocation of the scheduled transmission(s). This enables to ensure that the UE-B 112, as the receiver UE of the SCI, has obtained the corresponding resource reservation from its peer transmitter UE and thus the UE-B 112 would consider the reserved resource(s) as NPR(s) for its own transmission anyway. Therefore, unnecessary inclusion of non-used HARQ feedback resources to the set of inapplicable transmission resources may be avoided. As noted above, PSFCH resources are used as an example and therefore the example embodiments could be applied to any HARQ feedback resources.

According to an example embodiment, the UE-A 110 may assign the transmission resource(s) determined to be inapplicable, either from the point-of-view of the UE-B 112 or its intended receiver, in the set of inapplicable transmission resources ($S_{NPR,B}$), in response to determining that a priority associated with the transmission resource(s) is higher or equal to a threshold. The threshold may comprise a priority threshold for the priority of sidelink data transmission to be coordinated. The threshold may be preconfigured at the UEA 110 or the threshold may be configured by the network, for example by indicating the threshold in a control message transmitted by the base station 122 to the UE-A 110. The UE-A 110 may assign a non-preferred transmission resource into $S_{NPR,B}$, in response to determining that data priority associated with the determined resource is above the configured threshold. In another example, if the UEA 110 is aware of the priority of the UE-B's 112 transmission towards the intended receiver (e.g. by receiving a request or control message from the UE-B 112, which indicates the corresponding priority value m), the UE-A 110 may include a determined resource into $S_{NPR,B}$, in response to determining that the priority of the SCI reserving the determined resource indicates a priority value lower than m. In this example, a lower priority value indicates higher priority. This enables to increase the probability of the transmission resource(s) included in $S_{NPR,B}$ being actually used for transmission by the UE-B 112 due to the high priority. This enables to further reduce the amount of NPR signaling.

According to an example embodiment, the UE-A 110 may include the transmission resource(s) determined to be inapplicable, either from the point-of-view of the UE-B 112 or its intended receiver, in the set of inapplicable transmission resources ($S_{NPR,B}$), in response to determining that the transmission resource(s) belong to a plurality of periodically allocated transmission resources. Determining whether a transmission resource belongs to periodically allocated resources may be based on decoding a corresponding indication in the SCI. For example, the UE-A 110 may include a determined resource into $S_{NPR,B}$, in response to determining that the determined resource is part of a set of periodic resources detected by the UE-A 110. For example, upon the UE-A 110 detecting SCI sent to the UE-B 112, where the SCI reserves future transmission resource(s), the UE-A 110 may include the reserved transmission resource(s) in $S_{NPR,B}$, if the reserved transmission resource(s) are part of the periodic resources reserved by the SCI. This may enable to exclude transmission resources (or mark them as non-preferred) associated with the periodic transmission either from the UE-B 112 or from its intended receiver.

As noted above, the considered transmission to/from the UE-B 112 is not restricted to occur between the UE-B 112 and a third UE (e.g. UE-C 114). Such communication may occur also between the UE-B 112 and the UE-A 110 itself. The UE-A 110 may for example be the intended receiver of UE-B's 112 transmission. If the UE-A 110 has ongoing sidelink communication with the UEB 112, which reserves certain sidelink transmission resource(s), the reserved sidelink resource(s) may be also included in $S_{NPR,B}$. Hence, the transmission resource(s) included in the set of inapplicable transmission resources may comprise transmission resource(s) allocated to sidelink communication between the UE-A 110 and the UE-B 112.

According to an example embodiment, the UE-A 110 may be aware that the UE-B 112 is aware of some (or all) of the DRX OFF periods of the intended receiver. If the UE-B 112 is aware of the DRX configuration (e.g. DRX cycle) of the intended receiver, the UE-B 112 may not transmit anything to the intended receiver during the DRX OFF period of the intended receiver, regardless of whether the UE-A 110 indicates such transmission resources as non-preferred to the UE-B 112. The UE-A 110 may therefore determine that such transmission resource(s) are inapplicable for the UE-B 112 and signaling of these transmission resource(s) as NPR(s) to the UEB 112 may be avoided. The UE-A 110 may therefore include transmission resource(s) occurring during the DRX OFF periods of the intended receiver in $S_{NPR,B}$. If the indicated NPR is configured to be used by UE-B 112 for sidelink broadcast or sidelink groupcast, whose sidelink DRX configuration is preconfigured or configured by the network, both the UE-A 110 and UE-B 112 may be aware of the DRX OFF periods of the intended receiver. As noted above, in some embodiments the inter-UE coordination of NPR(s) may occur subsequent to provision of configuration data, for example information about DRX ON and OFF periods of the intended receiver, by the UEB 112 or the network to the UE-A 110. If the UE-A 110 is the intended receiver, the transmission resource(s) included in $S_{NPR,B}$ may further comprise transmission resource(s) allocated to sidelink communication between the UE-A 110 and the UE-B 112.

The set of NPR(s) may include only (i) time domain or (ii) both time and frequency domain non-preferred resources. For (i), if the set of NPR(s) is determined due to half-duplex and/or simultaneous transmissions issue, the UE-A 110 may indicate time slot or TTI indexes as NPR indication. In this case, if the UE-A 110 identifies for example UE-B 112 having sidelink reception/transmission from/to other UEs on the same time slots or TTIs (even if they were not in the same sub-channels), the UE-A 110 may exclude those time slots or TTIs from the NPR indication to the UE-B 112, for example, the time slots or TTIs included in the $S_{NPR,B}$. An indication of NPR(s) may therefore comprise an indication of time slots or TTIs. However, in general the time domain NPR(s) may be indicated by any other suitable means, for example as indication of sub-frames or time domain symbols such as OFDM symbols.

For (ii), if NPR(s) from the UE-A 110 are determined due to resource collision at the intended receiver (e.g. to solve a hidden UE problem), the UE-A 110 may indicate both time and frequency domain information of the colliding resource(s) to the UE-B 112 in the NPR set. In other words, the NPR(s) included by the UE-A 110 due to reception resources of the intended receiver and/or interference may be included in the set of NPR(s). Hence, they may not be excluded from the signaled NPR(s) by being included in $S_{NPR,B}$.

According to an example embodiment, the UE-A 110 may consider priority levels of sidelink communications when determining whether to include transmission resources in the set of inapplicable transmission resources. For example, if the UE-A 110 identifies that the UE-B 112 is scheduled to receive a sidelink communication with a higher priority from other UEs than UE-B's 112 own sidelink transmission over non-preferred resource(s) in the same time slots or TTIs, the UE-A 110 may exclude these time slots or TTIs from the NPR indication to the UE-B 112. Also, if a priority of a sidelink transmission at certain transmission resource(s) to the intended receiver(s) of the UE-B 112 is lower than a priority of a sidelink transmission on the same transmission resource(s) to the UE-B 112, the UE-A 110 may assign these transmission resources to $S_{NPR,B}$. Hence, transmission resource(s), for example time slot(s) or TTI(s), may be assigned to $S_{NPR,B}$, if the UE-B 112 would not use the transmission resource(s)s for its own transmission due to its prioritization procedure.

Also, if the UE-A 110 determines that UEB 112 is scheduled to transmit a sidelink transmission with a higher priority in the same time slot(s) or transmission time interval(s) (TTI) than a non-preferred transmission resource belonging to $S_{NPR,R}$, the UE-A 110 may include those non-preferred transmission resource(s) in $S_{NPR,B}$, since UE-B's 112 higher priority transmission would be anyway prioritized over the transmission to the intended receiver over the non-preferred transmission resource(s). This may be the case for example if the UE-B 112 has limited UE capability to support simultaneous transmissions. Hence, the UE-A 110 may assign transmission resource(s) to $S_{NPR,B}$, in response to determining that a priority of another sidelink transmission at the transmission resource(s) is higher than a priority of a sidelink transmission at the transmission resource(s) to the intended receiver.

According to an example embodiment, if the UE-A 110 identifies that the UE-B 112 may also transmit sidelink communications in the same time slots or TTIs using non-overlapping but with sufficient far apart frequency domain sub-channels, the UE-A 110 may not include those time slots in $S_{NPR,B}$, as the separation between the sub-channels would be sufficient to avoid inter-modulation interference, for example if the UE-B 112 supports simultaneous transmissions in this case. Hence, the UE-A 110 may not include in $S_{NPR,B}$ transmission resources overlapping in time domain with scheduled transmission(s), if a predetermined separation of sub-channels is provided in frequency domain. Sufficient separation may be dependent on capabilities of the transmitter UE filter to suppress out-of-band emissions. For example, a (pre)configured number of sub-channels or a (pre)configured number of physical resource blocks (PRB) may be applied. The (pre)configured number of sub-channels or PRBs may correspond to achieving out-of-band suppression equal to a threshold, for example 60 dB.

According to an example embodiment, the UE-B 112 may transmit data or signaling to the UE-A 110 on certain transmission resource(s). The UE-A 110 may receive this transmission. The UE-A 110 may assign to $S_{NPR,B}$ the transmission resource(s) that are associated with the transmission resource(s), from which the transmission was received, in configuration data of a resource pool from which the transmission was received. The UE-A 110 determine the transmission resources associated with these transmission resource(s) based on resource reservation period(s) indicated in the configuration data of the resource pool. This enables the configuration of the resource pool associated with the transmission to be taken into account when optimizing the NPR signaling. For example, transmission resource(s) overlapping with periodical resource reservations in that resource pool may be included in $S_{NPR,B}$.

At operation 504, the UE-A 110 may determine a reduced set of non-preferred transmission resources. The reduced set of NPR(s) may be denoted by $S_{NPR,O}$ ("O" for optimized). Determining the reduced set of NPR(s) may comprise excluding at least one of the set of inapplicable resources ($S_{NPR,B}$) from the set of determined NPR(s) ($S_{NPR,R}$). This reduces the amount of NPR signaling between the UE-A 110 and the UE-B 112. The UE-A 110 may for example exclude an intersection of the set of non-preferred transmission resources and the set of inapplicable transmission resources from the set of non-preferred transmission resources. This operation may be formulated as $$S_{NPR,O} = S_{NPR,R} - \{S_{NPR,R} \cap S_{NPR,B}\}.$$

The UE-A 110 may alternatively exclude (all of) the set of inapplicable transmission resources from the set of non-preferred transmission resources ($S_{NPR,O} = S_{NPR,R} - S_{NPR,B}$).

At operation 505, the UE-A 110 may transmit an indication of the reduced set of NPR(s) ($S_{NPR,O}$) to the UE-B 112. The UE-B 112 may then determine not to use these transmission resources, and the transmission resources otherwise inapplicable, for transmission of data to the intended receiver.

Figure 6:
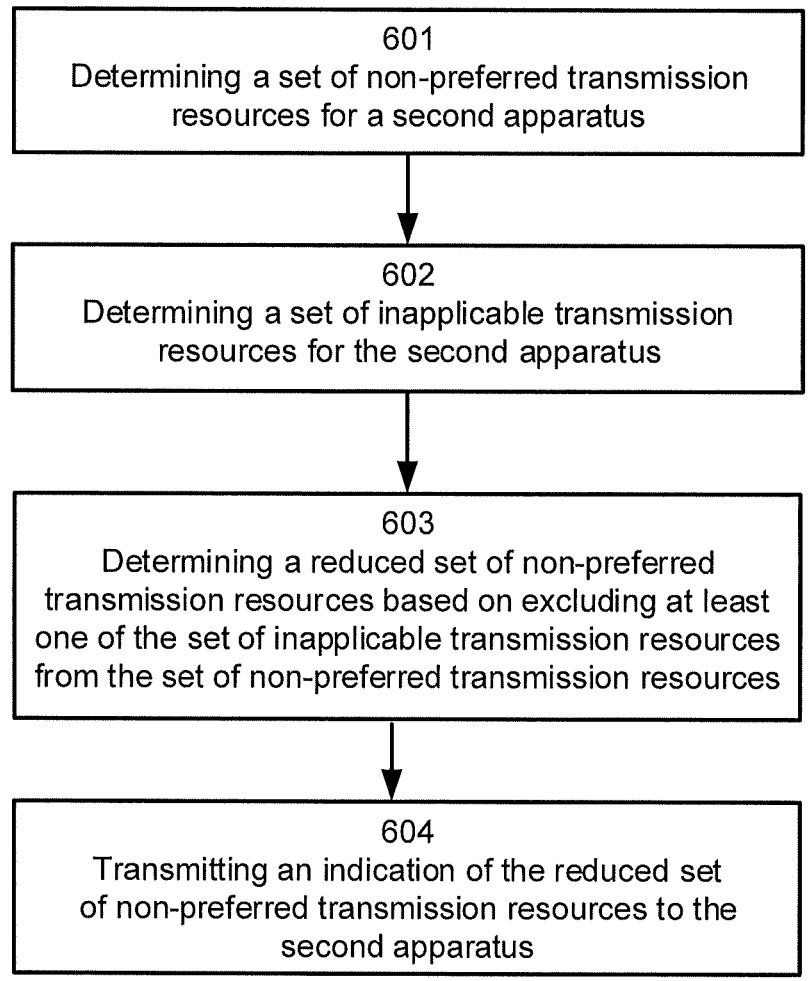
FIG. 6 illustrates an example of a method for signaling non-preferred transmission resources, according to an example embodiment.

FIG. 6 illustrates an example of a method for signaling non-referred transmission resources, according to an example embodiment. The method may be performed by an apparatus.

At 601, the method may comprise determining a set of non-preferred transmission resources for a second apparatus.

At 602, the method may comprise determining a set of inapplicable transmission resources for the second apparatus.

At 603, the method may comprise determining a reduced set of non-preferred transmission resources based on excluding at least one of the set of inapplicable transmission resources from the set of non-preferred transmission resources.

At 604, the method may comprise transmitting an indication of the reduced set of non-preferred transmission resources to the second apparatus.

Further features of the method directly result from the functionalities and parameters of the UE-A 110, UE-B 112, or UEC 114 or any of the base stations 120, 122, 124, as described in the appended claims and throughout the specification, and are therefore not repeated here. Different variations of the methods may be also applied, as described in connection with the various example embodiments.

An apparatus, for example the UE-A 110, UE-B 112, or UE-C 114 or any of the base stations 120, 122, 124 may be configured to perform or cause performance of any aspect of the methods described herein. Further, a computer program may comprise instructions for causing, when executed, an apparatus to perform any aspect of the methods described herein. Further, an apparatus may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
at least one processor; and at least one memory storing instructions that when executed by the at least one processor, cause the apparatus to:
determine non-preferred transmission resources for a second apparatus;
determine inapplicable transmission resources for the second apparatus, wherein the set of inapplicable transmission resources comprises transmission resources which the second apparatus would not use whether or not indicated as non-preferred transmission resources to the second apparatus;
determine a reduced set of non-preferred transmission resources based on excluding of inapplicable transmission resources from the non-preferred transmission resources; and
transmit an indication of the reduced set of non-preferred transmission resources to the second apparatus for data transmission.

2. The apparatus according to claim 1, wherein the at least one memory is storing instructions that when executed with the at least one processor, cause the apparatus to determine the reduced set of non-preferred transmission resources based on excluding an intersection of the set of non-preferred transmission resources and the inapplicable transmission resources from the non-preferred transmission resources.

3. The apparatus according to claim 1, wherein the inapplicable transmission resources comprises at least one first transmission resource overlapping with at least one scheduled transmission by the second apparatus or at least one scheduled transmission to the second apparatus.

4. The apparatus according to claim 1, wherein the at least one memory is storing instructions that when executed with the at least one processor, cause the apparatus to:
determine information of the second apparatus; and
assign the at least one first transmission resource to the inapplicable transmission resources, in response to determining that transmission at the at least one first transmission resource by the second apparatus is hindered due to at least one capability of the second apparatus indicated in the information.

5. The apparatus according to claim 1, wherein the information of the second apparatus is preconfigured at the apparatus, or wherein the at least one memory is storing instructions that when executed by the at least one processor, cause the apparatus to:
receive the capability of the second apparatus from the second apparatus or from the third apparatus.

6. The apparatus according to claim 3, wherein the at least one memory is storing instructions that when executed with the at least one processor, cause the apparatus to:
receive an indication of at least one identifier configured to be used by the second apparatus; and
determine the at least one first transmission resource based on sidelink control information indicative of a resource allocation of the at least one scheduled transmission, wherein the at least one scheduled transmission is associated with the at least one identifier configured to be used by the second apparatus.

7. The apparatus according to claim 6, wherein the at least one scheduled transmission comprises a hybrid automatic repeat request feedback transmission.

8. The apparatus according to claim 7, wherein the at least one memory is storing instructions that when executed with the at least one processor, cause the apparatus to:
assign the resource allocation of the at least one scheduled transmission, wherein the at least one scheduled transmission is indicated by the sidelink control information, to the set of inapplicable transmission resources, in response to detecting a hybrid automatic repeat request feedback message at a physical sidelink feedback channel resource associated to the sidelink control information indicative of the resource allocation of the at least one scheduled transmission.

9. The apparatus according to claim 1, wherein the at least one memory is storing instructions that when executed by the at least one processor, cause the apparatus to:
obtain capability information of at least one intended receiver of a sidelink data transmission by the second apparatus; and
assign at least one second transmission resource to the inapplicable transmission resources, in response to determining that reception from the at least one second transmission resource by the at least one intended receiver is hindered due to at least one capability indicated in the capability information of the at least one intended receiver.

10. The apparatus according to claim 9, wherein the intended receiver comprises the apparatus.

11. The apparatus according to claim 10, wherein the at least one second transmission resource comprises at least one sidelink transmission resource allocated for sidelink communication between the apparatus and the second apparatus.

12. The apparatus according to claim 1, wherein the at least one memory is storing instructions that when executed with the at least one processor, cause the apparatus to:
receive a transmission from the second apparatus from at least one third transmission resource; and
assign transmission resources associated with the at least one third transmission resource in configuration data of a resource pool from which the transmission is received to the set of inapplicable transmission resources.

13. A method, comprising:
determining a non-preferred transmission resources for a second apparatus;
determining a inapplicable transmission resources for the second apparatus, wherein the inapplicable transmission resources comprises transmission resources which the second apparatus would not use whether or not indicated as non-preferred transmission resources to the second apparatus;
determining a reduced set of non-preferred transmission resources based on excluding at least one of the inapplicable transmission resources from the set of non-preferred transmission resources; and
transmitting an indication of the reduced set of non-preferred transmission resources to the second apparatus.

14. The method of claim 13 further comprising determining the reduced set of non-preferred transmission resources based on excluding an intersection of the non-preferred transmission resources and the inapplicable transmission resources from the set of non-preferred transmission resources.

15. The method of claim 13 wherein the inapplicable transmission resources comprises at least one first transmission resource overlapping with at least one scheduled transmission by the second apparatus or at least one scheduled transmission to the second apparatus.

16. The method of claim 13 further comprising:
determining information of the second apparatus; and
assigning the at least one first transmission resource to the inapplicable
transmission resources, in response to determining that transmission at the at least one first transmission resource by the second apparatus is hindered due to at least one capability of the second apparatus indicated in the information.

17. The method of claim 13 further comprising:
obtaining information of at least one intended receiver of a sidelink data transmission by the second apparatus; and
assigning at least one second transmission resource to the inapplicable transmission resources, in response to determining that reception from the at least one second transmission resource by the at least one intended receiver is hindered due to at least one capability indicated in the information of the at least one intended receiver.

18. A non-transitory program storage device readable by a machine, tangibly embodying a program of instructions executable by the machine for performing operations, the operations comprising:
determining a non-preferred transmission resources for a second apparatus;
determining a set of inapplicable transmission resources for the second apparatus, wherein the inapplicable transmission resources comprises transmission resources which the second apparatus would not use whether or not indicated as non-preferred transmission resources to the second apparatus;
determining a reduced set of non-preferred transmission resources based on excluding at least one of the inapplicable transmission resources from the set of non-preferred transmission resources inapplicable transmission resources; and
transmitting an indication of the reduced set of non-preferred transmission resources to the second apparatus.

19. The apparatus according to claim 9, wherein the information of the at least one intended receiver comprises an indication of a discontinuous reception configuration of the at least one intended receiver.

20. The apparatus of claim 1, wherein the inapplicable resources is determined based on:
   determining information of the second apparatus comprising at least one of:
   an indication of whether the second apparatus supports multiple simultaneous transmissions at the sidelink interface, or an indication of whether the second apparatus supports for multiple simultaneous transmissions at the radio access network air interface, and
   determining that transmission at the at least one first transmission resource by the second apparatus is hindered due to at least one capability of the second apparatus indicated in the information.

21. The apparatus according to claim 1, wherein the at least one memory is storing instructions that when executed by the at least one processor cause the apparatus to:
   in response to determining that a priority associated with a transmission resource of the inapplicable transmission resources is higher or equal to a threshold, assigning a non- preferred transmission resource,
   wherein the comprises a priority threshold for the priority of sidelink data transmission to be coordinated, and
   wherein the threshold may be preconfigured at a user equipment or a network.

* * * * *